Aug. 3, 1965 J. A. M. DIKHOFF 3,198,671
METHOD OF MANUFACTURING MONOCRYSTALLINE
BODIES OF SEMI-CONDUCTIVE MATERIAL
Filed Jan. 25, 1961 4 Sheets-Sheet 1

INVENTOR
JOHANNES A. M. DIKHOFF
BY
AGENT

INVENTOR
JOHANNES.A.M. DIKHOFF
BY Frank R. Trifari
AGENT

INVENTOR
JOHANNES A. M. DIKHOFF
BY
Frank R. Jufari
AGENT

INVENTOR
JOHANNES A.M. DIKHOFF
BY
AGENT 3,198,671
Patented Aug. 3, 1965

3,198,671

METHOD OF MANUFACTURING MONOCRYSTALLINE BODIES OF SEMI-CONDUCTIVE MATERIAL

Johannes Aloysius Maria Dikhoff, Eindhoven, Netherlands, assignor to North American Philips Company, Inc., New York, N.Y., a corporation of Delaware Filed Jan. 25, 1961, Ser. No. 84,924
Claims priority, application Netherlands, Jan. 28, 1960, 247,854
2 Claims. (Cl. 148—1.6)

Figure 1:
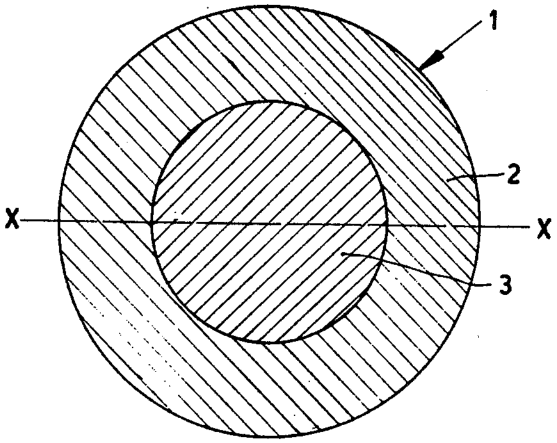

Monocrystalline bodies of semi-conductive material which are used in the semi-conductor art, inter alia for the manufacture of semi-conductor devices such, for example, as transistors, crystal diodes and photo-electric cells, are in practice usually manufactured in rods by bringing a crystal of the material into contact with a melt of the material and allowing the crystal slowly to grow due to solidification of the melt, for example by the Czochralski pulling method or by a zone-melting method, in which a molten zone is displaced from the crystal through a rod-shaped body of the semi-conductive material. In the said methods one or more active impurities (donors and/or acceptors) are used in the melt in a concentration or concentrations such that the concentration or concentrations in the material growing on the crystal and the resistivity of the material acquire the values desired. The correct choice of the concentration of such an impurity in the melt is possible since for each impurity in a given semiconductive material the ratio between the concentration of the relevant impurity in the growing material and its concentration in the melt, which ratio is in certain cases referred to as segregation constant $k$, is known when the method is carried out in the same manner, for example a determined rate of growing is used, and has a constant value which is independent of the concentration of the impurity as used in the melt. Whenever reference is made to concentration, this is always intended to mean the concentration expressed in atoms of active impurity per cub. cm. of the semi-conductive material.

However, it has been found that in the rod-shaped bodies of semi-conductive material manufactured by the known methods mentioned above, the undesirable phenomenon may occur that the resistivity in directions transverse to the axis of the body is not homogeneous and that next to a portion having the resistivity to be expected, there is formed a portion, usually located at the center and extending in the longitudinal direction of the body, having a resistivity which differs from that of the first-mentioned portion due to a corresponding difference in concentration of active impurity. Such a portion having a different concentration of the impurity, or different concentrations of the impurities, will be referred to hereinafter as "core," whereas the adjoining first-mentioned portion will be referred to as "marginal portion." Hitherto, in practice, monocrystalline bodies were obtained with a core having a resistivity lower than that of the marginal portion. As an initial material for semi-conductor devices, such as crystal diodes or transistors, such a monocrystalline body has the disadvantage of inhomogeneity and the further disadvantage that the material of the core in such devices may give rise to unduly low breakdown voltages.

The production of such a core, hereinafter referred to as core formation, was regarded hitherto as a phenomenon which could not substantially be controlled. In my prior copending patent application, Ser. No. 53,692, filed Sept. 2, 1960, it has already been mentioned that core formation is connected with the orientation of the crystal lattice relative to the direction of growing and that the core is usually formed at the area where the normal to the solidification front or liquid-solid interface between the growing crystal and the melt was located in a main crystallographic direction of the crystal. In a semi-conductor having a diamond or similar structure, such as the zincblende structure, a core with a greatly differing concentration of the impurity or greatly differing concentrations of the impurities occurs, for example, if the direction of growing coincides, at least substantially, with a [111]-axis of the crystal lattice. According to my said prior application, the orientation of the growing crystal is chosen so that the direction of growing differs sufficiently from a main direction and more particularly from the [111]-direction of the crystal to prevent core formation.

The present invention, however, relates to the manufacture of monocrystalline bodies of semi-conductive material in which a crystal of the material grows, due to coagulation of a melt of the material, in a direction with which core formation does occur.

An object of the invention is inter alia to utilize the core formation in a controllable manner.

Another object of the invention is to eliminate, at least substantially, the effect of the core formation upon the inhomogeneity of the body as regards resistivity.

The invention is based upon recognition of the fact that when using one impurity the resistivity in the core differs from that in the marginal portion to an extent which is dependent upon the impurity chosen. It is also based upon the recognition that, as confirmed by resistivity measurements, under unvaried conditions of carrying out the method, in a portion of the body grown at a certain moment, the ratio between the concentration of an impurity in the core, which concentration will be referred to hereinafter as "core concentration" or "$c_{core}$," and the concentration of this impurity in the marginal portion, hereinafter referred to as "marginal concentration" or "$c_{margin}$," has for each impurity a specific value which is substantially independent of the value of the marginal concentration. Said ratio will be referred to hereinafter in the specification and claims as "core-formation factor" or "$\alpha$." Expressed in a formula, the core-formation factor is $$\alpha=\frac{c_{core}}{c_{margin}} \qquad (I)$$

The core and marginal concentrations of an impurity may be determined by resistance measurements. It is to be noted that the value of the core-formation factor of an impurity may be somewhat different under different conditions of carrying out the method, for example for different crystallization rates of the growth on the crystal, as is also the case with the segregation constant $k$. In addition, the core-formation factor of an impurity depends upon the crystal orientation for which the core formation occurs. However, if conditions are chosen in the same manner, the core formation factor of an impurity is constant for different concentrations of the impurity used in a melt.

Since the marginal concentration of an impurity is determined by the concentration of the impurity used in the melt, $c$, and the segregation constant, $k$, according to the equation $$c_{margin}=kc \qquad (II)$$

the core concentration of the impurity, as appears from the combination of the Equations I and II, is also determined by the concentration in the melt according to the equation $$c_{core}=\alpha kc \qquad (III)$$

The invention is also based upon the recognition that the core formation factors of the various impurities are usually different and may in certain cases differ considerably. By using two or more impurities having different core-formation factors, it is now possible to provide for both the resistivity and the conductivity type in the marginal portion and the resistivity and the conductivity type in the core to be controlled comparatively independently of each other by suitable choice of the impurities and their concentrations in the melt, it being possible inter alia to manufacture bodies having a homogeneous specific conductivity and also to manufacture bodies with pn-transitions in a reproducible manner.

According to the invention, inter alia, in order to reach the aims mentioned above, in the manufacture of monocrystalline bodies of semi-conductive material in which, due to coagulation of a melt of the material, a crystal of the material grows in a direction with which core formation occurs, at least two active impurities having different core-formation factors are used in the melt in concentrations at which a magnitude A is substantially equal to unity or less than unity, in which A is defined by the equation $$A=\frac{\sum(\alpha_d k_d c_d)-\sum(\alpha_a k_a c_a)}{\sum(k_d c_d)-\sum(k_a c_a)} \quad \text{(IV)}$$

In the equation, $\alpha_d$ and $\alpha_a$ represent the core-formation factors and $k_d$ and $k_a$ represent the segregation constants of the donors and the acceptors present respectively, which magnitudes are constant and may be determined by resistance measurements. The concentrations of the donors and acceptors in the melt are indicated by $c_d$ and $c_a$ respectively and $\Sigma$ means the summation of the relevant products placed between brackets, over all the active impurities (donors or acceptors) present in the melt. From Formula III it can be seen that $\Sigma(\alpha_d k_d c_d)$ is equal to the sum of the core concentrations of the donors and that $\Sigma(\alpha_a k_a c_a)$ is equal to the sum of the core concentrations of the acceptors. The numerator in the Equation IV thus indicates the core concentration of the excess of donors or the negative core concentration of the excess of acceptors, which concentrations determine the resistivity and the conductivity type of the core. From Formula II it follows that $\Sigma(k_d c_d)$ is equal to the sum of the marginal concentrations of all donors and $\Sigma(k_a c_a)$ is equal to the sum of the marginal concentrations of all acceptors. The denominator in the Equation IV thus indicates the marginal concentration of the excess of donors or the negative marginal concentration of the excess of acceptors, which concentrations determine the resistivity and the conductivity type of the marginal portion.

In order to obtain a monocrystalline body of a given conductivity type in which the resistivity in the core is never lower than that in the marginal portion of the body, it is possible, for example, to use impurities in the melt in concentrations for which the magnitude A has a value comprised between 0 and 1, so that the body produced is suitable to be used for the manufacture of transistors and crystal diodes in which the chance of unduly low breakdown voltages occurring is small.

The invention provides more particularly the possibility to obtain a body having a substantially homogeneous resistivity by using impurities in concentrations for which the magnitude A is substantially equal to unity. Thus, the core concentration of the excess of donors or acceptors becomes equal to the marginal concentration of the excess of donors or acceptors.

The invention also provides more particularly the possibility to obtain a pn-junction which extends in the direction of growth of the crystal, by using at least one donor and at least one acceptor in the melt in concentrations for which the magnitude A is less than zero or negative, or expressed in a formula $$A=\frac{\sum(\alpha_d k_d c_d)-\sum(\alpha_a k_a c_a)}{\sum(k_d c_d)-\sum(k_a c_a)}<0 \quad \text{(V)}$$

If the denominator is negative and the numerator is positive, the core becomes n-conductive due to an excess of donors and the marginal portion becomes p-conductive due to an excess of acceptors, whereas the opposite phenomenon occurs in the reverse case.

Figure 2:
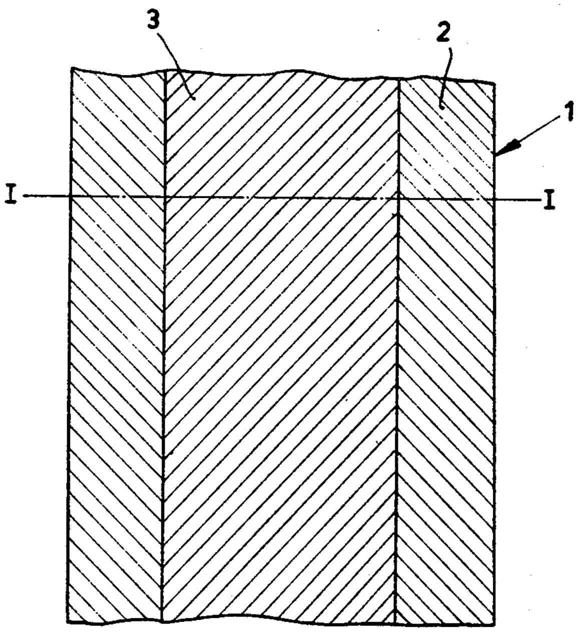

In order that the invention may be readily carried into effect, it will now be described in detail, by way of example, with reference to the accompanying diagrammatic drawings, in which:

FIGURES 1 and 2 show a cross-section and a longitudinal section, respectively, of a monocrystalline rod-shaped body of semi-conductive material obtained by the pulling-up method, in which core formation has occurred, and FIGURES 3 to 12 show graphs representing for several cases the variation in concentration of impurities along a line X—X at right angles to the longitudinal axis of a body as shown diagrammatically in FIGURE 1. The concentrations are plotted along the axis of ordinates and the relevant places on the line X—X are plotted along the axis of abscissae.

In order to show how a core may be present in a monocrystalline semi-conductive body, FIGURES 1 and 2 show a monocrystalline rod-shaped body 1 of semi-conductive material which may be obtained by the pulling-up method and in which a seed crystal is orientated so as to form a co-axial symmetrical core concentric with the periphery of the rod-shaped body, for example, by pulling a germanium seed crystal from a germanium melt, a [111]-axis being orientated according to the pulling direction. However, it is not essential for the invention as to where the core formation occurs, since the core may be located excentrically or even at the edge of the body in the case of a different orientation and when using other methods, for example zone-melting in an elongated crucible wherein the solidification front is greatly asymmetrical. In the body 1 a marginal portion 2 having a homogeneous concentration of impurities surrounds a core 3 having different concentrations of these impurities. The diameter of the core depends upon the curvature of the solidification front during growing. If the curvature is small, the core usually has a comparatively large diameter, as shown in FIGURES 1 and 2. If the curvature is great, the core usually has a small diameter.

Figure 3:
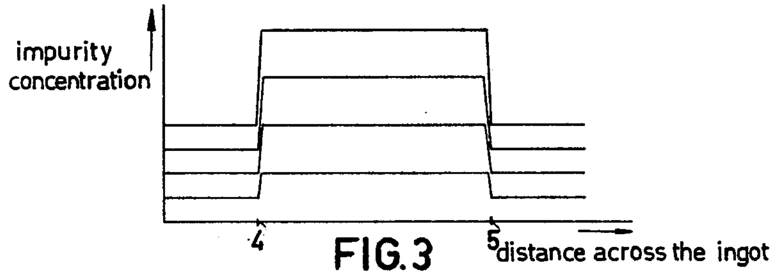
Figure 4:
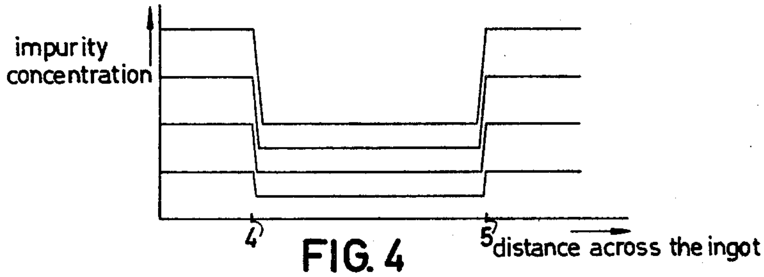
Figure 5:
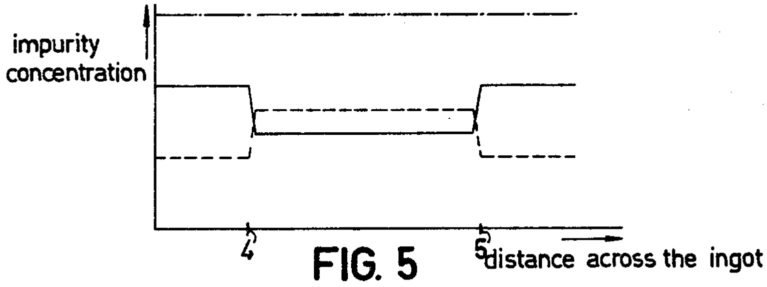

FIGURES 3 and 4 show diagrammatically how an impurity may be distributed over the core and the marginal portion.

FIGURE 3 shows diagrammatically the variation in concentration of one impurity having a core-formation factor greater than unity. The different curves relate to different concentrations of the impurity used in the melt. Points 4 and 5 along the axis of abscissae indicate the points where the line X—X of FIGURE 1 intersects the boundary between the marginal portion and the core, the core being located between these two points. The concentrations of the impurity are greater in the core than in the marginal portion. The transitions from the marginal concentrations to the core concentrations are not shown exactly vertically for the sake of clarity. When comparing the curves shown with one another, FIGURE 3 shows that for the areas between the points 4 and 5, the ratios of the concentrations represented by the various curves are substantially equal to the corresponding ratios of the concentrations outside these points.

It has been found that not only impurities occur having a core-formation factor greater than unity, but also impurities having a core-formation factor less than unity. The curves shown diagrammatically in FIGURE 4 relate to such an impurity, the curves relating to different concentrations of the impurity used in the melt. However, in this case, the concentrations between the points 4 and 5 are smaller than outside these points.

The variation of the curves shown in FIGURES 3 and 4 may be determined by resistance measurements at the surface of a cross-section as shown in FIGURE 1, for example along the line X—X through the centre of the core. The local concentrations in the marginal portion and in the core may be calculated in a manner known per se from the resistance values found and the core-formation factor $\alpha$ of the relevant impurity may readily be computed, since $\alpha$ in these cases is equal to the ratio between the specific conductivity in the core and that in the marginal portion. For a given semi-conductive material it is thus possible to determine the core-formation factors of different active impurities.

Thus, monocrystalline rod-shaped bodies of germanium were manufactured from molten germanium by the pulling method with the aid of seed crystals, all of which were orientated so that a [111]-axis coincided with the pulling direction. In each case the pulling velocity was 1 mm. per minute, the crystal being rotated about its axis at a speed of 50 revolutions per minute.

It has been found that all these bodies contained cores. By using more than one melt and only one impurity in different concentrations, the core-formation factor of the impurity could be determined and the constancy of the core-formation factor proved. Thus, it appeared that in rods activated with antimony wherein the resistivities of the marginal portions of the rods varied between 0.05 and 20 ohm-cm., the resistivities of the cores were ⅔ of those of the associated marginal portions, so that the core-formation factor of antimony in germanium for a core grown in a [111]-direction of the seed crystal was found to be 1.5.

The core-formation factors of several active impurities for cores in germanium crystals grown in the [111]-direction are specified in the table below in addition to their segregation constants for the associated marginal portions.

*Table*

| Active impurity | Segregation constant $k$ | Core-formation factor $\alpha$ |
|---|---|---|
| P | 0.12 | 2.5 |
| As | 0.04 | 1.8 |
| Sb | 0.003 | 1.5 |
| Ga | 0.1 | 0.85 |
| In | 0.001 | 1.4 |
| Tl | 0.00004 | 1.2 |

We will now describe how several effects may be obtained by using more than one impurity.

In order to obtain a homogeneous resistivity, for example over the cross-section shown in FIGURE 1, it suffices to use only two impurities. Use is preferably made of either two impurities of the same type, the core-formation factor of the first impurity, $\alpha_1$, being greater than unity and that of the second, $\alpha_2$, being less than unity, or a donor and an acceptor having core-formation factors each of which is either greater than unity or less than unity.

When using two impurities of the same type, the concentrations of the impurities in the melt are chosen so that the ratio between the concentration of the first impurity, $c_1$, and that of the second impurity, $c_2$, is substantially equal to the magnitude B, defined by the equation $$B=\frac{k_2(1-\alpha_2)}{k_1(\alpha_1-1)} \qquad \text{(VI)}$$

wherein $k_1$ and $k_2$ represent the segregation constants of the first and the second impurity respectively. The resultant variation in the concentrations of the two impurities is shown diagrammatically in FIGURE 5. The variation in concentration of the impurity with $\alpha_2$ less than unity is indicated by the curve in full line and the variation in concentration of the impurity with $\alpha_1$ greater than unity is represented by the curve in broken line, while the sum of these concentrations is shown by a dot-and-dash curve which in this example has the shape of an unbroken horizontal straight line.

The choice of the ratio $c_1/c_2$ may be computed by setting the magnitude or quantity A from the Equation IV for two impurities of the same type to be equal to unity, or expressed in a formula $$\frac{\alpha_1k_1c_1+\alpha_2k_2c_2}{k_1c_1+k_2c_2}=1$$

and computing therefrom the ratio $c_1/c_2$ as follows:

$$\alpha_1k_1c_1+\alpha_2k_2c_2=k_1c_1+k_2c_2$$

$$(\alpha_1-1)k_1c_1=(1-\alpha_2)k_2c_2$$

$$\frac{c_1}{c_2}=\frac{k_2(1-\alpha_2)}{k_1(\alpha_1-1)}$$

If it is desired to obtain a total homogeneous concentration, Z, of the two impurities in the crystallizing material, the concentrations to be used in the melt may be computed as follows. With the aid of Formula II one finds the conditions $$Z=k_1c_1+k_2c_2 \qquad \text{(VII)}$$

From the Equations VI and VII is may be computed that $$c_1=\frac{1}{k_1}\frac{(1-\alpha_2)}{(\alpha_1-\alpha_2)}Z \qquad \text{(VIII)}$$

and that $$c_2=\frac{1}{k_2}\frac{(\alpha_1-1)}{(\alpha_1-\alpha_2)}Z \qquad \text{(IX)}$$

The Equations VIII and IX may alternatively be computed with the aid of the Equation VI and the equation derived from the Formula III for the total core concentration Z:

$$Z=\alpha_1k_1c_1+\alpha_2k_2c_2 \qquad \text{(X)}$$

As an example for obtaining monocrystalline p-germanium having a resistivity of 2 ohm-cm. both in the marginal portion and in the core of a monocrystalline rod-shaped body, it is possible to pull a seed crystal in a [111]-direction from a germanium melt containing the acceptors indium having a core-formation factor greater than unity and gallium having a core-formation factor less than unity. In p-type germanium having a resistivity of 2 ohm-cm. the total concentration of the acceptors, Z, must be $1.8\times10^{15}$ atoms per cub. cm. of germanium.

From Formulae VIII and IX and by the use of the values for $k$ and $\alpha$ specified in the table, it can be found that for this purpose the concentration of indium in the melt must be equal to $$c_{In}=\frac{1}{0.001}\frac{(1-0.85)}{(1.4-0.85)}\times1.8\times10^{25} \text{ atoms per cub. cm. of germanium}$$

$$=4.9\times10^{17} \text{ atoms per cub. cm. of germanium}$$

and that the concentration of gallium in the melt must be equal to $$c_{Ga}=\frac{1}{0.1}\frac{(1.4-1)}{(1.4-0.85)}\times1.8\times10^{15} \text{ atoms per cub. cm. of germanium}$$

$$=1.3\times10^{16} \text{ atoms per cub. cm. of germanium}$$

For this purpose 100 gs. of the germainum melt must contain 1.8 gms. of indium and 0.029 mg. of gallium.

If it is desired to obtain a homogeneous conductivity by the use of two impurities of different type, the impurities are chosen so that the impurity which has to determine the conductivity type of the body has a core-formation factor which differs from unity to a lesser extent than does the core-formation factor of the other impurity.

For the concentrations used for the two impurities of opposite type, the ratio between the donor concentration, $c_d$, and the acceptor concentration, $c_a$, in the melt should be substantially equal to the magnitude B', whose equation is $$B'=\frac{k_a(\alpha_a-1)}{k_d(\alpha_d-1)} \quad \text{(XI)}$$

Figure 6:
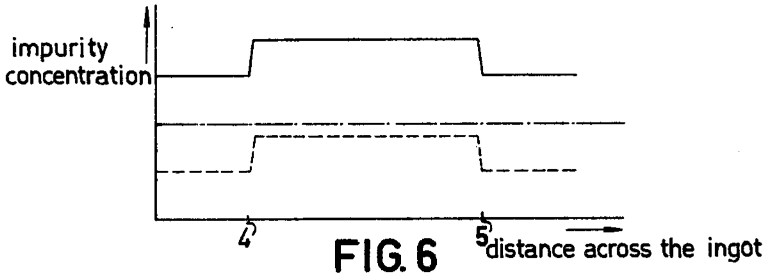

FIGURE 6 shows the variation in concentration of these impurities along the line X—X of FIGURE 1; it being assumed that the core-formation factors of the two impurities are greater than unity. The variation in concentration of the impurity having the smaller core-formation factor is represented by the curve in full line and the variation in concentration of the impurity having the larger core-formation factor is represented by the curve in broken line. The variation in concentration of the excess of impurity having the smaller core-formation factor $\alpha$ is represented by the dot-and-dash curve which in this case has the shape of a straight full horizontal line.

The choice of the ratio $c_d/c_a$ may be computed, in a similar manner as the Equation VI, from the equation that the magnitude A is equal to unity, this equation then being as follows:

$$A=\frac{\alpha_d k_d c_d-\alpha_a k_a c_a}{k_d c_d-k_a c_a}=1 \quad \text{(XII)}$$

If one desires a homogeneous concentration of excess acceptor in the growing material of the crystal, $Z_a$, it is necessary to use two impurities having core-formation factors for which there applies that either $$\alpha_d'>\alpha_a'>1 \quad \text{(XIII)}$$

$$\alpha_d'<\alpha_a'<1 \quad \text{(XIV)}$$

From the Equation II follows the conditions:

$$Z_a=k_a c_a-k_d c_d \quad \text{(XV)}$$

From the Equations XI and XV it may be computed that $$c_a'=\frac{1}{k_a'}\frac{(\alpha_d'-1)}{\alpha_d'-\alpha_a'}Z_a$$

and $$c_d'=\frac{1}{k_d'}\frac{(\alpha_a'-1)}{\alpha_d'-\alpha_a'}Z_a$$

both in the case that condition (XIII) applies to the core-formation factors and in the case that condition (XIV) applies to the core-formation factors.

If one desires a homogeneous concentration of excess donor in the growing material of the crystals, $Z_d$, the concentrations of the donor and acceptor to be used in the melt may be computed in a similar manner.

In order to obtain monocrystalline p-germanium, it is possible, for example, to use in the germanium melt, in addition to indium as an acceptor having a core-formation factor of 1.4, phosphorous or arsenic having core-formation factors of 2.5 and 1.8 respectively.

As an example, a p-type germanium crystal of 4 ohm.-cm. may be prepared by pulling a seed crystal of germanium in a [111]-direction from a germanium melt containing the acceptor indium and the donor arsenic, the core-formation factor of the latter one being larger than that of the first one, both factors being larger then unity.

In this case $Z_a$ must be $9\times10^{14}$ atoms per cub.-cm. of germanium, $\alpha_a'$ will be 1.4, $k_a'$ will be 0.001, $\alpha_d'$ will be 1.8 and $k_d'$ will be 0.04. From the above equations it may be calculated that $c_a'$ has to be about $18\times10^{17}$ atoms per cub. cm. germanium and $c_d'$ has to be about $2.2\times10^{16}$ atoms per cub. cm. germanium. For this purpose 100 gs. of the germanium melt must contain 0.05 mgs. of arsenic and 6.4 mgs. of indium. It is fundamentally also possible to use indium and antimony having core-formation factors of 1.4 and 1.5 respectively, but in practice a donor and an acceptor having core-formation factors which differ reasonably, for example by at least 0.4, will be preferred.

In order to obtain a pn-junction extending in the direction of growing of the crystal, the use of only one donor and one acceptor suffices. In this case also, use is preferably made of impurities having core-formation factors which differ reasonably, for example, by at least 0.4, so that the choice of the concentration ratio between the donor and the acceptor is less critical and a very accurate knowledge of the segregation constants and of the core-formation factors is less necessary.

Figure 7:
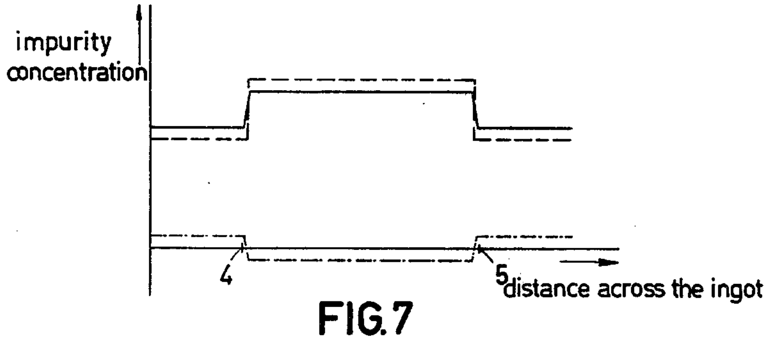

FIGURE 7 shows diagrammatically the variation in concentration of the impurities along the line X—X of FIGURE 1, for example, of an acceptor (curve in full line) and of a donor (curve in broken line), the core-formation factors of which differ but slightly, for example $\alpha_a=1.3$ and $\alpha_d=1.5$. To obtain a pn-transition, the concentrations of the two impurities must differ only sightly both in the marginal portion and in the core. In FIGURE 7, for example, the concentration ratio outside the core $$\frac{c_{d\ margin}}{c_{a\ margin}}=0.92$$

and within the core $$\frac{c_{d\ core}}{c_{a\ core}}=1.06$$

the curve in dot-and-dash line shows the concentration of the excess of acceptor in the material when it lies above the axis of abscissae and the concentration of the excess of donor when it lies below the axis of abscissae. From this curve it can be seen that a small variation in the concentration ratios of the impurities in the melt may mean the total disappearance of the pn-junction.

Figure 8:
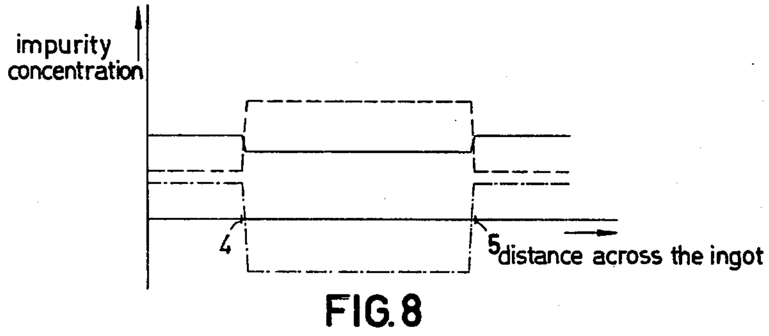

FIGURE 8 shows the variation in concentration of an acceptor (curve in full line) and of a donor (curve in broken line) having greatly differing core-formation factors. In this case, the core-formation factor of the acceptor is even smaller than unity and that of the donor is greater than 2. From the shape in the dot-and-dash curve, which shows the concentration of the excess of acceptor or donor in the same manner as in FIGURE 7, it can be seen that the possibility of the pn-junction disappearing is small even for comparatively large variations in the concentrations used for the impurities. Such a pn-junction may be obtained, for example in germanium, in a very simple manner when using gallium and phosphorus in the melt, the core-formation factors of which are 0.85 and 2.5 respectively.

When using only one donor and only one acceptor, the Equation IV may be written as follows:

$$A=\frac{\alpha_d k_d c_d-\alpha_a k_a c_a}{k_d c_d-k_a c_a}$$

in which for obtaining a pn-junction the concentrations must be chosen so that the magnitude A becomes less than zero or negative, or expressed in a formula:

$$A=\frac{\alpha_d k_d c_d-\alpha_a k_a c_a}{k_d c_d-k_a c_a}<0 \quad \text{(XVI)}$$

From Equation XVI it may be deduced that, in order to obtain a core of n-type conductivity and a marginal portion of p-type conductivity, in which the numerator in the Equation XVI must be positive and the denominator must be negative, $\alpha_d$ must be greater than $\alpha_a$, and that the ratio between the concentration of the donor $c_d$, and the concentration of the acceptor, $c_a$, in the melt must be chosen to be larger than the magnitude D, whose equation is $$D=\frac{\alpha_a k_a}{\alpha_d k_d}$$

but must be chosen to be smaller than the magnitude E, whose equation is $$E=\frac{k_a}{k_d}$$

because if the ratio $c_d/c_a$ was larger than the magnitude E, the magnitude A would even become larger than unity.

When by way of example from a germanium melt a germanium crystal is prepared having an n-type core with a resistivity of 4 ohm cm. and p-type marginal portions of 4 ohm cm. the surplus donor concentration in the core should become about $4\times10^{14}$ atoms per cub. cm. of germanium and the surplus acceptor concentration in the marginal portions about $9\times10^{14}$ atoms per cub. cm. of germanium. The magnitude A for these concentrations will be about −0.45.

When using one donor and one acceptor we may write:

$\alpha_d k_d c_d - \alpha_a k_a c_a = 4\times10^{14}$ atoms per cub. cm. of germanium and $k_d c_d - k_a c_a = -9\times10^{14}$ atoms per cub. cm. of germanium. From these two equations the concentrations $c_d$ and $c_a$ may be derived.

So when using phosphorus as the donor material and gallium as the acceptor material the concentration of the first one, $c_p$, has to be about $16\times10^{15}$ atoms per cub. cm. of germanium. For this purpose the molten germanium should contain about 0.0057 mg. of phosphor and 0.035 mg. of gallium per 100 gs. of germanium.

If it should be desired to obtain a core of p-type conductivity and a marginal portion of n-type conductivity it may be deduced from Equation XVI, in which the numerator must be negative and the denominator must be positive, that $\alpha_d$ must be smaller than $\alpha_a$, while the ratio between the concentration of the donor, $c_d$, and the concentration of the acceptor, $c_a$, in the melt must be chosen to be smaller than the magnitude D, and large than the magnitude E.

Figure 9:
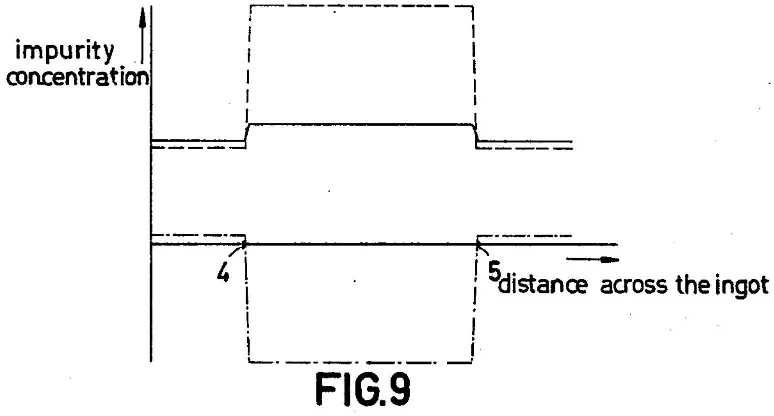
Figure 10:
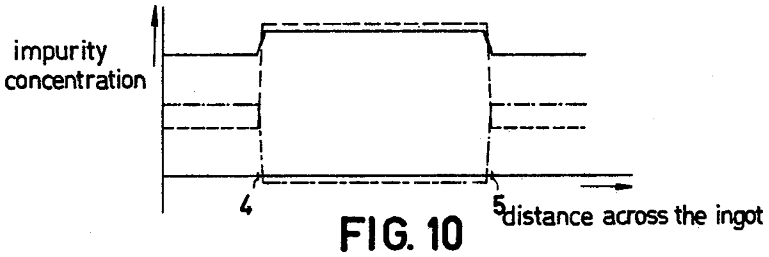

As also shown in FIGURES 8 to 10, for obtaining a pn-junction use is preferably made of concentrations of the impurities in the melt for which the magnitude A has a value of at least −5 and/or at most −0.2. Expressed in formulae $$A=\frac{\sum(\alpha_d k_d c_d)-\sum(\alpha_a k_a c_a)}{\sum(k_d c_d)-\sum(k_a c_a)}\geqq -5$$

and or $$A=\frac{\sum(\alpha_d k_d c_d)-\sum(\alpha_a k_a c_a)}{\sum(k_d c_d)-\sum(k_a c_a)}\leqq -0.2$$

FIGURE 8 shows the case where the two above-mentioned conditions are fulfilled, as may appear from the dot-and-dash curve showing the concentrations of the excess of acceptor in the marginal portion and of the excess of donor in the core.

FIGURE 9 shows a case where one donor and one acceptor are used and where the magnitude A is smaller than −5, while FIGURE 10 shows a case where one donor and one acceptor are used in concentrations for which the magnitude A is larger than −0.2. The curves shown in full line, in broken line and in dot-and-dash line have the same meaning as the curves in FIGURES 7 and 8. From FIGURES 9 and 10 it will be evident that either the segregation constants (FIGURE 9), or the segregations constants and the core-formation factors (FIGURE 10) must be known very accurately and that the concentrations must be chosen very accurately to ensure that a pn-junction is obtained.

Hitherto, cases have been described in which only two impurities are used, but it will be evident that corresponding results are obtainable with more than two impurities.

It has been found possible to proceed in a manner such that by suitable addition to the melt the specific conductivity and/or the conductivity type of the core is varied without the conductivity properties of the marginal portion being influenced to any appreciable extent. In this preferred embodiment, a mixture is manufactured containing at least one donor and at least one acceptor in a concentration ratio such that, when using this mixture in the melt, a marginal portion is formed in which the sum of the marginal concentrations of the donors of this mixture is equal to the sum of the marginal concentrations of the acceptors thereof, or expressed in a formula:

$$\Sigma_m(k_d c_d)-\Sigma_m(k_a c_a)=0$$

wherein $\Sigma_m$ represents a summation sign over the active impurities of the mixture. However, the impurities in the mixture are such that the core concentrations of the acceptors of the mixture differ from the core concentrations of the donors thereof, or expressed in a formula:

$$\Sigma_m(\alpha_d k_d c_d)-\Sigma_m(\alpha_a k_a c_a)\neq 0$$

Such a mixture may be used in addition to an impurity which determines the conductivity type and the specific conductivity of the marginal portion, in order to influence at will the specific conductivity and, if desired, the conductivity type of the core, for example in order to obtain the specific conductivity of the core the same as that of the marginal portion, or to obtain the conductivity type of the core opposite to that of the marginal portion without influencing to any appreciable extent the conductivity and the conductivity type of the marginal portion. These effects may be obtained by suitable proportioning of the mixture in the melt.

Figure 12:
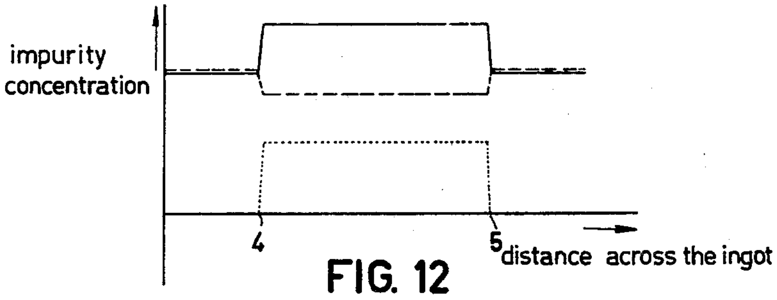

Thus, it is possible to manufacture a mixture containing one donor and one acceptor having different core-formation factors, for example a donor having a core-formation factor larger than unity and an acceptor having a core-formation factor smaller than unity, the atomic amounts of donor and acceptor in this mixture being in inverse relationship to their segregation constants. FIGURE 12 shows the result of the use of such a mixture in the melt. The curve in full line shows the variation in the concentration of the donor, the curve in broken line shows the variation in the concentration of the acceptor and the curve in dotted lines shows the concentration of the excess of donor of the two impurities of the mixture, the last-mentioned curve coinciding with the axis of abscissae in the marginal portion. In the marginal portion the concentrations of the donor and the acceptor are equal to $k_d''\times c_d''$ and $k_a''\times c_a''$ respectively, wherein $k_d''$ and $k_a''$ represent the segregation constants and $c_d''$ and $c_a''$ represent the concentrations in the melt of the donor and the acceptor, respectively, of the mixture. Since the equation applies that $$\frac{c_a''}{c_d''}=\frac{N_a}{N_d}=\frac{k_d''}{k_a''}$$

wherein $N_a$ and $N_d$ indicate the numbers of atoms of the donor and the acceptor, respectively, per mg. of the mixture, it follows that $$c_a''\times k_a''=c_d''\times k_d''$$

However, the impurity having the larger core-formation factor, the donor in the case of FIGURE 12, will be present in the core in a larger concentration that the impurity of opposite type having the smaller core-formation factor, as can be seen from the dotted curve of FIGURE 12.

Figure 11:
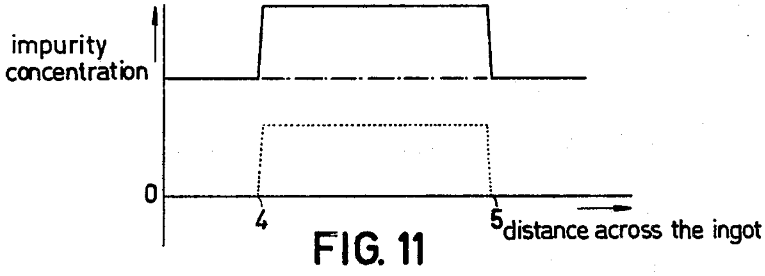

FIGURE 11 shows diagrammatically how such a mixture may be used for compensating the unduly high core concentration of an acceptor with positive core-formation factor used in the melt, the variation in concentration of the acceptor being represented by the full line, the concentration of the excess of donor of the impurities used in the mixture being represented by the dotted curve, and the resulting concentrations of the excess of acceptor being represented by a dot-and-dash curve, which concentration for the marginal portion is equal to the concentration of the acceptor with positive core-formation factor, and for the core is equal to that of the marginal portion.

Using quantities of the mixture larger than necessary for compensation is also possible, for example, in order to obtain, in addition to a p-type conductive margin, an n-type conductive core, without at least any appreciable influencing of the specific conductivity and the conductivity type of the marginal portion.

So a mixture containing phosphorus and gallium respectively in an atomic ratio of about 5:6 or in a ratio by weight of about 7:19 may be added to a germanium melt containing an acceptor in order to decrease the conductivity of the formed p-type core or to render the core n-type without affecting substantially the conductivity and the conductivity type of the marginal portions.

It is to be noted that it is fundamentally possible to use an impurity in the mixture identical with that for determining the conductivity and the conductivity type of the marginal portion.

Although in the specific examples germanium is used as the semi-conductive material, the invention may be applied in the formation of single crystals of other semi-conductive materials by using at least two different impurities. For instance other well-known semi-conductive materials from which single crystals may be prepared from a melt are silicon, in which phosphorus, arsenic and antimony are well-known donors and boron, aluminium, gallium and indium are well known acceptors, $A^{III}B^{V}$ compounds, such as InSb and GaAs, in which selenium, sulphur and tellurium are donors and copper, zinc and cadmium are acceptors, lead chalcogenides, such as PbS, in which bismuth and indium are donors and silver, copper, and gold are acceptors, and cadmium telluride (CdTe), in which indium, gallium, chlorine, bromine and iodine are donors and silver, gold and copper are acceptors.

What is claimed is:

1. A method of growing from a melt a monocrystalline body of semiconductive material with a substantially uniform transverse electrical resistivity characteristic, comprising growing a single crystal under given growth conditions from an active-impurity-containing melt of a semiconductive material with the crystal oriented relative to the liquid-solid interface to produce core-formation, a condition at which active impurities in the melt become incorporated in different concentrations in a core portion and a marginal portion of the grown crystal, each active impurity exhibiting a specific core-formation factor, $\alpha$, determined by the given growth conditions and defined as the ratio of the said impurity's concentration in the core portion and the said impurity's concentration in the marginal portion of the grown crystal, and providing in the melt from which the crystal is grown at least two active impurities selected from the group consisting of donors and acceptors and having different core-formation factors, $\alpha$, and in concentrations, $c$, at which a quantity A is substantially equal to +1, wherein $$A=\frac{\sum(\alpha_d k_d c_d)-\sum(\alpha_a k_a c_a)}{\sum(k_d c_d)-\sum(k_a c_a)}$$

where $\alpha_d$ is the core-formation factor at said given growth conditions of a donor present, $\alpha_a$ is the core-formation factor at said given growth conditions of an acceptor present, $k_d$ is the segregation constant at said given growth conditions of a donor present, $k_a$ is the segregation constant at said given growth conditions of an acceptor present, $c_d$ is the concentration of a donor present expressed in atoms of the donor per cubic centimeter of the semi-conductive material, $c_a$ is the concentration of an acceptor present expressed in atoms of the acceptor per cubic centimenter of the semiconductive material, and $\Sigma$ is the summation of the bracketed products over all donors and acceptors present in the melt, said core-formation factors and segregation constants being measured for the semiconductive material at, and being determined by, the said given growth conditions employed, both active impurities being of the same conductivity-forming type, one having a core-formation factor above 1 and the other having a core-formation factor below 1.

2. A method as set forth in claim 1 wherein the concentration ratios of first and second impurities constituting the active impurities in the melt is substantially equal to $$\frac{k_2(1-\alpha_2)}{k_1(\alpha_1-1)}$$

where $k_1$ and $\alpha_1$ are the segregation constant and core-formation factor, respectively, of the first impurity, and $k_2$ and $\alpha_2$ are the corresponding constants of the second impurity.

References Cited by the Examiner

UNITED STATES PATENTS

| | | | |
|---|---|---|---|
| 2,861,905 | 11/58 | Indig et al. | 148—1.5 |
| 2,879,189 | 3/59 | Shockley | 148—1.5 |

DAVID L. RECK, *Primary Examiner.*

RAY K. WINDHAM, *Examiner.*

UNITED STATES PATENT OFFICE
CERTIFICATE OF CORRECTION

Patent No. 3,198,671 August 3, 1965

Johannes Aloysius Maria Dikhoff

It is hereby certified that error appears in the above numbered patent requiring correction and that the said Letters Patent should read as corrected below.

Column 6, line 53, for "$10^{25}$" read -- $10^{15}$ --; column 10 line 59, for "that" read -- than --.

Signed and sealed this 18th day of January 1966.

(SEAL)
Attest:

ERNEST W. SWIDER
Attesting Officer

EDWARD J. BRENNER
Commissioner of Patents